United States Patent [19]

Martin et al.

[11] Patent Number: 4,624,825

[45] Date of Patent: Nov. 25, 1986

[54] DIFFERENTIAL MOVEMENT CHAIN MECHANISM FOR CONTROLLING A NUCLEAR REACTOR

[75] Inventors: Jean Martin, Chatillon; Claude LaFosse, Le Plessis-Robinson, both of France

[73] Assignee: Framatome, Courbevoie, France

[21] Appl. No.: 518,326

[22] Filed: Aug. 1, 1983

Related U.S. Application Data

[63] Continuation of Ser. No. 201,084, Oct. 27, 1980, abandoned.

[30] Foreign Application Priority Data

Oct. 31, 1979 [FR] France ................................ 79 26996

[51] Int. Cl.⁴ ............................................... G21C 7/14
[52] U.S. Cl. .................................... 376/227; 376/233; 376/268; 294/86.14
[58] Field of Search ............... 376/228, 233, 227, 268, 376/270, 271, 264; 294/86 A, 86 CG, 86.14

[56] References Cited

U.S. PATENT DOCUMENTS

| | | | |
|---|---|---|---|
| 3,179,569 | 4/1965 | Fortescue et al. | 376/270 |
| 3,421,635 | 1/1969 | Bunger | 376/271 |
| 4,219,384 | 8/1980 | Cramer et al. | 376/227 |

FOREIGN PATENT DOCUMENTS

| | | | |
|---|---|---|---|
| 708093 | 4/1965 | Canada | 294/86 A |
| 2204838 | 8/1973 | Fed. Rep. of Germany | 376/268 |
| 1191938 | 10/1959 | France . | |
| 877844 | 9/1961 | United Kingdom | 376/227 |
| 1001652 | 8/1965 | United Kingdom | 376/264 |
| 1005514 | 9/1965 | United Kingdom | 376/233 |
| 1129062 | 10/1968 | United Kingdom | 376/268 |
| 1216994 | 12/1970 | United Kingdom | 376/227 |

*Primary Examiner*—Harvey E. Behrend
*Attorney, Agent, or Firm*—Pollock, Vande Sande & Priddy

[57] ABSTRACT

The mechanism has at least one carrier sprocket wheel (18–19) fixed on a horizontal shaft (15) mounted on the body of a grab (4) with pivoting fingers. An apparatus (14) for actuating the pivoting fingers connected to the shaft allows them to open and close to take up or, alternatively, release the absorbent unit. Drive chain wheels (25–26) allow the portions (20–21) of a chain supporting the carrier pulley (18–19) to be moved, either in synchronism to move the absorbent assembly or with a differential movement to actuate the pivoting fingers of the grab (4). A single differential pinion apparatus (31–32) allows the two kinds of movement to be carried out.

The invention can be applied particularly to the control and emergency shutdown of pressurized water nuclear reactors.

7 Claims, 6 Drawing Figures

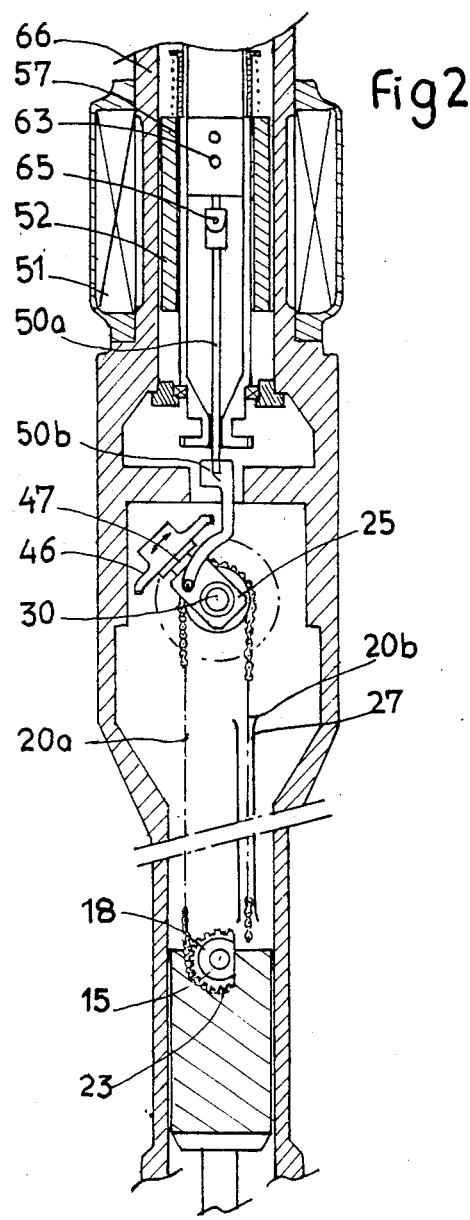
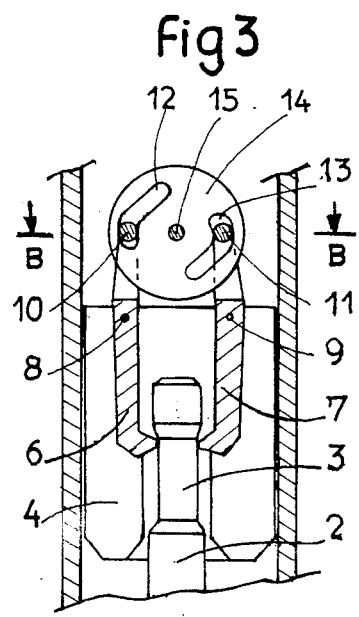
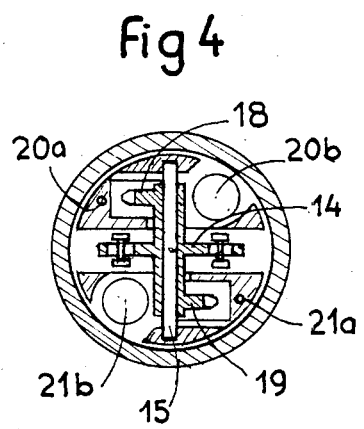

DIFFERENTIAL MOVEMENT CHAIN MECHANISM FOR CONTROLLING A NUCLEAR REACTOR

This application is a continuation of application Ser. No. 201,084, filed Oct. 27, 1980, now abandoned.

The invention concerns a differential movement chain mechanism for controlling a nuclear reactor, by vertical movement of a unit absorbing the neutrons in the core of the reactor and the dropping of this unit under the action of its weight into maximum insertion position.

BACKGROUND

To control nuclear reactors, so as to obtain variable power in operation, units are moved, generally in the vertical direction, which absorb the neutrons inside the reactor-core in which the fuel elements are found.

As the elements absorbing the neutrons are generally introduced through the top of the core, their insertion is increased by a downward movement and decreased by an upward movement. In the first instance, a lessening of reactor power is obtained, and in the other instance, an increase in this power is obtained.

In the event of emergency shutdown of the reactor necessitated by malfunction, it is necessary to put the absorbent elements in maximum insertion position in the reactor core very rapidly in order to stop the nuclear reaction.

To do this, the absorbent elements are generally allowed to fall into maximum insertion position in the reactor core under the action of their own weight.

In the case of pressurized water nuclear reactors, for example, the units absorbing the neutrons are constituted by very long tubes containing a material which is strongly absorbent of neutrons. These very long tubes are grouped in units termed control clusters, each of these control clusters or rods being associated with a fuel assembly. To control the reactor, the control rods are moved vertically, which produces a movement of the tubes containing the absorbent material between the fuel rods which are in vertical position in the core and grouped so as to form fuel assemblies.

Various mechanical or electro-mechanical apparatuses have already been proposed for carrying out controlled movement of the control rods in the vertical direction and to obtain immediate dropping of these control rods upon emergency shutdown.

These mechanisms are, however, complex and bulky, which is inconvenient because the whole mechanism has to be housed in a sealed casing in communication with the interior of the reactor vessel and disposed in the upper part of this vessel.

Thus, pawl apparatuses and rack-and-pinion apparatuses have been proposed which necessitate special machining of a shaft, termed control shaft, extending the absorbent element upwards, so as to obtain a series of equally spaced slots on this shaft or a rack.

There is also a known grab for handling fuel assemblies in nuclear reactors. Vertical movements in both directions for raising and inserting fuel assemblies are carried out by a synchronized movement of two cables oppositely wound on two pulleys fixed on one and the same shaft borne by the grab. Opening or closing of the claws of the grab so as to take up or release the fuel elements is carried out by a differential movement of the two cables which produces a rotation of the pulleys borne by the grab and the actuating of the pivoting fingers of the grab by means of a complex kinematic chain.

The differential movement of the cables for opening or closing the fingers of the grab is obtained by rotating the bevel wheel of a differential of the conventional type, with bevel pinions engaged with two differential pinions allowing arms to be set in rotation to effect differential movement of the cables.

With such an apparatus, therefore, it is necessary to provide a first means allowing a perfectly synchronous movement of the two cables to be achieved to lift or lower the fuel elements, and a second independent means for opening or closing the fingers.

An apparatus of this type has never been proposed for effecting movement of the control rods of a nuclear reactor and for dropping these control rods upon emergency shutdown.

In the case of mechanisms for control rods, the use of cable apparatuses is unsuitable. In practice, the cables require large radii of curvature for winding and very large drums, so that it is difficult to house such apparatuses in the casings provided for the mechanisms. Furthermore, use of drums causes a movement in the axis of the cable during winding or unwinding.

Lastly, the cables are not suitable for use in a medium such as the high-temperature and high-pressure water or the liquid sodium which most often constitute the exchanger fluid of the reactor.

However, there are known apparatuses which use chains providing vertical portions assuring lifting and chain wheels to assure movement and guiding of these chains, these apparatuses allowing control of the movement of the load and avoidance of any slipping in operation, and also being far smaller in size.

However, a lifting apparatus has never been devised which has chains which can be used to move the control rods of a nuclear reactor and for rapidly actuating the dropping of these rods into maximum insertion position in the reactor core.

SUMMARY OF THE INVENTION

The object of the invention is therefore a differential movement chain mechanism for controlling a nuclear reactor, by vertical movement of a unit absorbing the neutrons in the core of the rector and the dropping of this unit under the action of its weight into maximum insertion position, upon emergency shutdown, the absorbent element having at its upper part a connecting piece, or control shaft, allowing the absorbent unit to be connected to the mechanism for its controlled movement when the pivoting fingers of a grab borne by the chains are in closed position on the control shaft, or its dropping, when the fingers are in opened position, the vertical movement of the grab and the absorbent element being obtained by means of the synchronous movement of two lifting portions fixed to the grab and the opening and closing movements of the fingers of the grab by a differential movement of the lifting portions, the mechanism having, inside a sealed casing in communication with the interior of the nuclear reactor:

at least one chain wheel, termed carrier pulley, fixed on a horizontal shaft mounted for rotation on the body of the grab at least one chain supporting the carrier pulley, and a differential gear apparatus, and allowing extremely accurate and highly controlled movements of the control rods and very great operational reliability as regards the opening of the fingers, while being of very simple and compact construction.

With this object:

the shaft of the carrier pulley is connected to an apparatus for actuating the pivoting fingers, the rotation of the shaft in either direction causing opening or closing of the fingers, by means of the actuating apparatus, each of the chains has a vertical path on at least one side of the carrier pulley, guided around a drive sprocket wheel with a shaft parallel to the shaft of the carrier pulley at the upper part of its course, the chain or chains constituting at least two lifting portions disposed on either side of the carrier pulley, each passing over a drive pulley, and the differential apparatus has a drive gear driven by a motor apparatus, a set of pinions mounted to rotate in a fixed support solid with the sealed casing so as to transmit the rotation of the drive gear, and a movable support mounted to pivot with respect to the sealed casing in which at least one pinion is mounted to rotate, engaging with at least one of the pinions of the fixed part of the differential, the movable support being connected to a movement member for holding it in position or for moving it in either direction, while at least two pinions of the differential driven in rotation at the same speed and in different directions, when the motor apparatus is started, the movable support being held in position, are each solid with a drive pulley for vertically moving the absorbent unit, the movement of the movable support producing a differential rotation of the two pinions solid with the drive pulleys so as to cause, through the chains, the rotation of the shaft and the opening or closing or the pivoting fingers.

Two embodiments of the chain mechanism according to the invention used to control a pressurized water nuclear reactor will now be described, by way of nonlimiting example, with reference to the attached drawings.

BRIEF DESCRIPTION OF THE DRAWINGS

FIG. 2 is a view in elevation of the apparatus with partial sectioning at a perpendicular plane in the plane of section of FIG. 1.

FIG. 3 is a view at A—A of FIG. 1.

FIG. 4 is a section at B—B of FIG. 3.

DETAILED DESCRIPTION

Figure 1:
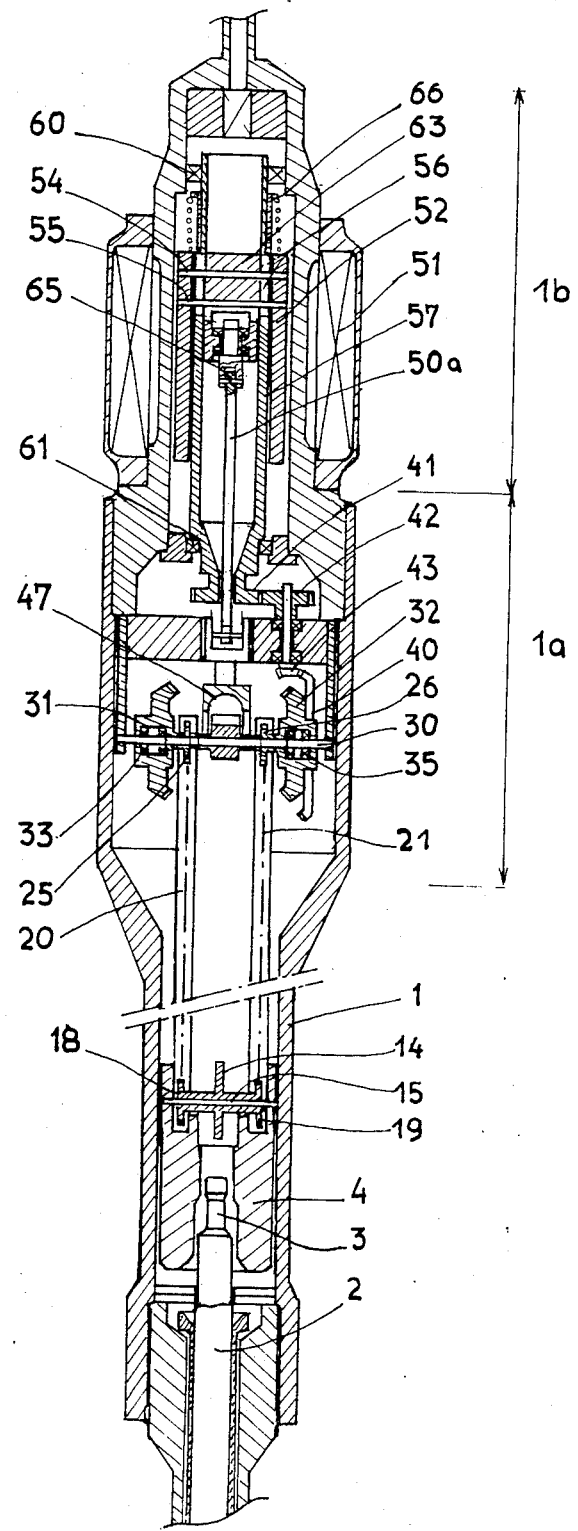
FIG. 1 is a sectional view at a vertical plane of symmetry of a first embodiment of the apparatus according to the invention.

FIG. 1 shows the casing 1 in communication with the reactor vessel and mounted sealed on this vessel which is entered by the control shaft 2 connected at its lower part (not shown) to the control rod whose movement mechanism is represented in FIG. 1.

At its upper part, the control shaft 2 has a groove 3 disposed at the level of the grab 4 constituting one part of the mechanism for moving the control rods according to the invention.

As shown in FIG. 3, the grab has two claws 6 and 7 for gripping the control shaft made in the shape of two pivoting claws articulated at 8 and 9 on the body of the grab.

The upper part of these pivoting claws 6 and 7 has rollers 10 and 11 which are engaged in the apertures 12 and 13 constituting the active parts of a circular cam 14 fixed on a shaft 15 mounted to rotate on the upper part of the grab 4.

Also on the shaft 15, mounted and fixed rigidly on either side of the cam 14, there are two chain wheel portions 18 and 19 with gearing allowing engagement with two chains 20 and 21 fixed at a point (such as 23 for the chain 20, as seen in FIG. 2) on the pulley portions 18 and 19 respectively.

The chain 20 (and the chain 21 whose path is identical) shown in FIG. 2 has a vertical path between the pulley 18 and a driving guide pulley 25 which also has teeth which engage with the chain.

After passing over the pulley 25, the chain 20 passes into a guide 27 constituting the reservoir for chain for vertical movement of the grab 4 suspended by the portion 20a of the chain 20 (termed carrier portion) and at the corresponding portion 21a of the chain 21. The slack portion 20b passing into the guide 27 has a length which is determined by the amplitude of maximum movement of the control rod suspended from the control shaft 2 and thereby from the grab 4.

The chain 21 is mounted in the same way as the chain 20 and passes over an upper drive pulley 26 so that a carrier portion 21a and a slack portion 21b can be defined on the chain 21.

The two chain wheel portions 18 and 19 of chain wheel are mounted on either side of the shaft 15, as shown in FIG. 4, so that the chains 20 and 21 are oppositely mounted on the carrier pulleys 18 and 19 at the upper part of the grab.

In the same way, the chains 20 and 21 pass in the reverse direction over the driving guide pulleys 25 and 26 at the upper part of their path.

The upper part 1a, larger in diameter, of the pressurized casing 1 contains the unit which allows the pulleys 25 and 26 to be driven in rotation.

The part 1a of the pressurized casing contains a differential mounted on a shaft 30 which is transverse to and solid with the casing 1.

The differential has two differential bevel pinions 31 and 32 respectively solid with the drive chain wheels 25 and 26, and unit constituted by the pinion 31 and the pulley 25 being mounted to rotate on the shaft 30 through a bearing device 33 and the unit constituted by the pinion 32 and the pulley 26 being mounted to rotate on the shaft 30 through a set 35 of bearings.

The drive gear 40 of the differential is rigidly mounted solid with the differential pinion 32 and is itself driven in rotation by an assembly of pinions 41, 42, 43 constituting a kinematic chain transmitting the rotation of a motor 54, which will be described in more detail hereinafter, to the drive gear 40 of the differential.

The differential also has a planetary bevel pinion 46 mounted to rotate in a planet carrier 47 and assuring the transmission of the rotation of the differential pinion 32 to the differential pinion 31.

In this way, when the differential pinion 32 is set in rotation at the same time as the drive gear 40 which is solid with it, the differential pinion 31 is set in rotation in the reverse direction.

In practice, the planet carrier 47 which is mounted to rotate on the shaft 30 can be held stationary by means of a holding member 50 which will be described hereinafter.

When the planet carrier 47 is stationary, rotation of the drive gear 40 produces rotations in opposite directions of the two differential pinions and the two chain wheels 25 and 26 associated with them.

Given the winding direction of the chains 20 and 21 on the drive pulleys 25 and 26, the rotation in opposite directions of these two pulleys causes either an upward or a downward movement of the grab 4, the carrier pulleys 18 and 19 urged in reverse direction by the chains 20 and 21, respectively and fixed on the shaft 15 remaining stationary.

To set the pinions of the differential in rotation in either direction from the drive gear 40 and the kinematic chain 41, 42, 43, a motor apparatus is used, positioned inside the uppermost part 1b of the pressurized casing.

This motor apparatus is constituted by an electric stepping motor with a stator 51 disposed outside the sealed casing and surrounding the part 1b of this casing and a rotor 52 disposed inside the sealed casing at its part 1b.

The rotor 52 has two bores in the radial direction inside which pins 54 and 55 are disposed.

Firstly, these pins 54 and 55 allow the fall of the rotor 52 to be halted when the stator 51 is not supplied, the pin 55 then coming to rest at the bottom of an aperture 56 made in a sleeve 57 mounted to rotate by means of bearings 60 and 61 inside the casing 1b. The pin 54 allows the upwards movement of the rotor 52 to be limited when the stator 51 is supplied and the rotor comes into the position of maximum flux. The pin 54 then serves as upper stop for the rotor by coming to rest on the upper part of the aperture 56 in the sleeve 57.

When the stator is supplied, setting the rotor 52 in rotation causes rotation of the sleeve 57 which is mounted to rotate in the casing and which bears the gear 41 constituting the beginning of the kinematic chain driving the differential, transmission of the rotation of the rotor 52 to the sleeve 57 being effected through the pins 54 and 55.

The pins 54 and 55 also allow the support 63 for the member 50 for holding and moving the planet carrier 47 to be connected to the rotor 52.

In practice, by means of a Cardan joint 65, the support bears the control shaft 50a constituting, with the actuating cap 50b articulated on the planet carrier 47, the apparatus for holding and moving the planet carrier.

A spring 66 disposed between the upper part of the rotor 52 and the fixed casing 1 allows the rotor 52 to be returned to the low position when the supply to the stator 51 is cut off.

When the stator 51 of the motor is supplied, the rotor comes into the high position such as that represented in FIG. 1, driving the support 63 and the member 50 upwards, thus causing a rotation of the planet carrier 47 about the shaft 30, which causes the differential pinion 31 of the differential to be set in rotation in the same direction, therefore setting in rotation the chain wheel 25 and the carrier pulleys 18 and 19 in the same direction. During this rotation the grab is moved very slightly downwards and the shaft 15 is set in rotation, which has the effect of driving the cam 14 fixed on this shaft in rotation.

The active parts 12 and 13 of this cam are designed so that, at the end of the upward movement of the stator and the apparatus 50, the pivoting fingers are positioned and kept in their closed position, as represented in FIG. 3.

The control shaft 2 is then driven by the grab 4 in its displacement movements which are caused by the stepping motor rotating.

As long as supply to the motor is maintained, this motor is either stepped in one direction or the other, causing a rising or descending movement of the grab with the shaft and the control rod or the motor is fixed in a given angular position with the control rod then held in a defined vertical position. The apparatus 50 keeps the planet carrier in fixed position, which on the one hand assures that the drive pulleys solid with the differential pinions of the differential or set in rotation in different directions and on the other hand keeps fixed in rotation the shaft 15 of the cam 14 which stays in such a position that it locks the claws 6 and 7 in closed position.

Therefore, the grab driving the shaft and the control rod can be made to move with any amplitude and in either direction by the stepping motor, or the grab, the shaft and the control rod can be kept in fixed position in the vertical direction by maintaining supply to the stator 51 so as to keep the rotor 52 in its high position.

If supply to the stator 51 is cut off, the rotor 52 falls again under the action of its own eight and under the action of the force of the spring 16 to the low position, which causes the fingers to open by means of rotation of the cam 14, which is itself driven by the rotation of the shaft 15 caused by the rotation in the same direction of the two pulleys 18 and 19 driven through the chain 20 and the drive pulley 25 set in rotation by the movement of the planet carrier 47 when the apparatus 50 accompanying the rotor 52 falls.

It will be seen that, thus, once the claws 6 and 7 have released the control shaft 2 to which the control rod is fixed, dropping of the control bar into its maximum insertion position is obtained in an extremely simple and very reliable way.

Figure 5:
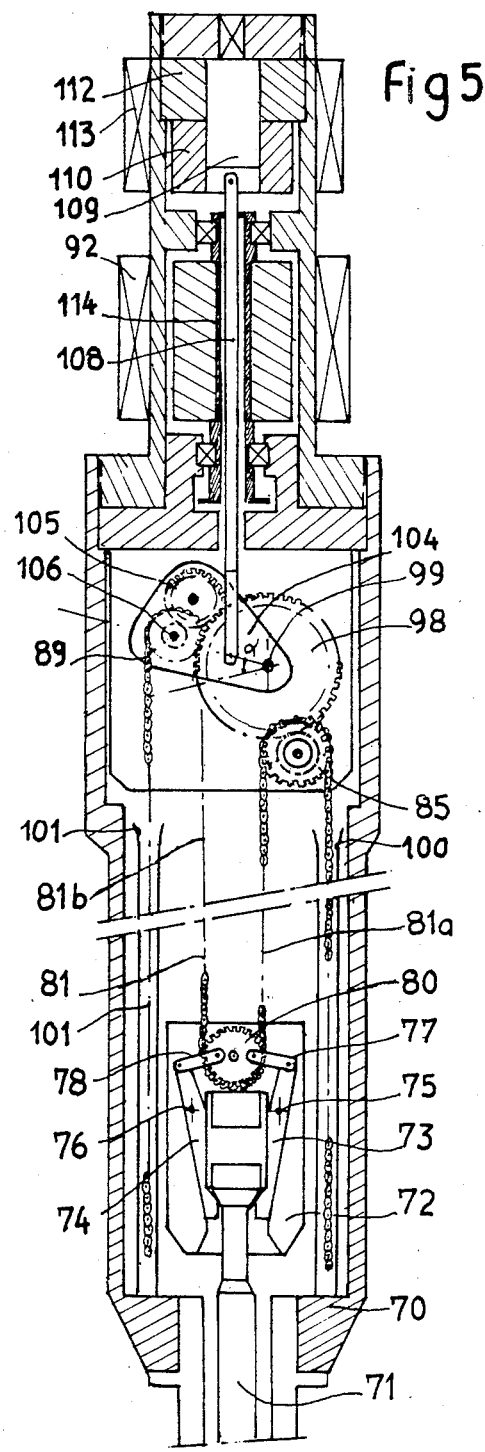
FIG. 5 is a sectional view at a vertical plane of symmetry of a second embodiment of the apparatus according to the invention.
Figure 6:
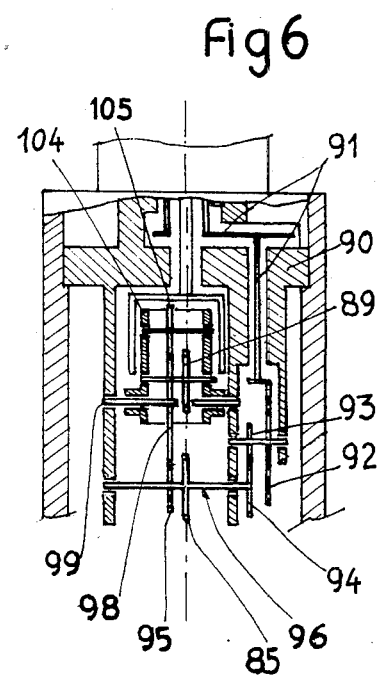
FIG. 6 is a sectional view at a plane perpendicular to the plane of section of FIG. 5 of one part of the apparatus represented in FIG. 5.

FIGS. 5 and 6 show another embodiment of the chain mechanism according to the invention.

The assembly of members necessary for moving and dropping the control rod are disposed inside the sealed casing 70 connected to the nuclear reactor vessel. The control shaft 71 connected to the control rod is, as before, taken up by a grab 72 with pivoting fingers such as 73 and 74 pivotably mounted at 75 and 76 on the body of the grab 72. These fingers are connected articulatedly at their upper parts to links 77 and 78 which are themselves articulated at their other ends on a carrier pulley 80.

The pulley 80 is a chain wheel mounted to rotate about its horizontally directed shaft on the body of the grab 72.

A chain 81 supports the pulley 80 and constitutes the two vertical lifting portions 81a and 81b passing respectively over the drive pulleys 85 and 89 at the upper part of their course.

The chain 81 is a roller chain whose slack portions respectively corresponding to the carrier portions 81a and 81b fall into guides 100 and 101.

It will be seen that, on synchronous movement of the lifting portions 81a and 81b in either direction, the carrier pulley 80 and the grab 72 are driven in a translatory movement (lifting or descending) and that, on differential movement of these lifting portions, the carrier pulley turns, which causes opening or closing of the pivoting fingers.

The two differential mechanisms allowing synchronous movement or differential movement of the portions of the chain 81 are shown in FIGS. 5 and 6.

The whole mechanism is housed in a fixed support 90 solid with the sealed casing 70.

This mechanism has a kinematic chain 91 driven by a stepping motor 92, in engagement with the drive gear 92.

The pinion 92 is keyed on a shaft mounted in the support 90 to which a pinion 93 is also keyed engaging with a pinion 94 keyed on a shaft 96. The chain wheel 85 and a pinion 95 engaging with a gear wheel 98 fixed on a shaft 99 mounted to rotate in the fixed support 90 are also fixed on the shaft 96 mounted to rotate in the frame 90.

Also mounted to rotate on the shaft 99 is a movable support 104 constituted by two parallel side plants between which are mounted on horizontal shafts, a pinion 105 engaging with the gear wheel 98, a pinion 106 engaging with the pinion 105 and the chain wheel 89 keyed on the same shaft as the pinion 106.

The movable support can be held in position or, conversely, moved by pivoting through an angle α, by means of a shaft 108 forming part of a holding and moving member 109 which will be described hereinafter. When the movable support is held in position by means of the shaft 108, the setting in rotation of the kinematic chain 91 transmitted to the differential by a drive gear 92, causes rotation of the chain wheels 85 and 89 in different directions and at the same speed, the intermediate pinions being provided for this purpose.

The lifting portions 81a and 81b of the chain 81 are then driven in an upward or downward movement at the same speed, according to the direction of rotation of the motor 92, stopping being possible in any position, at the end of a step by the motor 92. The grab then drives the rod connected to the control shaft 71, if the fingers are closed on the grooved upper part of the latter.

In addition to the shaft 108 articulated at its lower part on the movable support 104, the holding and moving member 109 has a magnetic part 110 to which the upper part of the shaft 108 is articulated and an electro-magnet with a magnetic part 112 and a coil 113 outside the sealed casing 70.

When the coil 113 is supplied, the magnetic parts 112 and 110 are held in contact and the movable support 104 is itself held in the high position.

Movement of the control rod to control the reactor can be achieved since the fingers 73 and 74 are held in closed position, as represented in FIG. 5.

If supply to the coil 113 is cut off, the magnetic part 110 falls, driving the shaft 108. The movable support turns through the angle α about the shaft 99.

This rotation causes a rotation of the pinions 105 and 106 and the chain wheel 89, the chain wheel 85 remaining stationary since it is connected to the kinematic chain 91 held locked in position.

This differential rotation of the pulley 89 causes a rotation of the carrier pulley 80, causing the fingers 73 and 74 to open and the rod to fall into maximum insertion position in the reactor. The body of the grab descends again by a slight amount corresponding to the slightly lower position of the shaft of the drive pulley 89.

The kinematic chain 91 includes a stepping motor 92 whose stator is outside the casing 70 and whose rotor is inside this casing and solid with a sleeve 114 which has the vertical axis of the apparatus as its axis.

It will be clear that the principal advantages of the apparatus according to the invention are its very simple design and its very high reliability in operation.

In practice, movement of the control rod is controlled perfectly by controlling the stepping motor, and holding of the control rod in any vertical position is also assured by holding angular position in this stepping motor.

Control of the dropping of the rods in the event of emergency shutdown is also obtained in an extremely simple and highly reliable way, since it is only necessary to cut off supply to the stator of the stepping motor in one instance or to the electro-magnet in the other.

In practice, the transmission of movement of the simple mechanical apparatuses constituted by the chains of the chain wheels and the pinions is accurately and reliably obtained.

Furthermore, the whole apparatus has far fewer parts than previously known apparatuses, and the differential used both to control movement of the chains and opening and closing of the claws of the grab can be made in a very compact form, so that this apparatus, which has two different functions, takes up only a small amount of space in the pressurized casing 1.

In addition, the chains, which are simple, strong construction elements, can be made of materials which behave well in pressurized water.

In addition, the arrangement of the chains in a square, in the case of the first embodiment which is possible because of the use of the differential which allows opposite directions of rotation to be obtained for the pulleys, provides a construction which is extremely easy to house in the cylindrical structure of the casing.

Compared with the pawl apparatuses of the prior art, the chain apparatus also has the advantage of avoiding shocks, vibrations and noise since movement is practically continuous.

The invention, however, is clearly not limited to the apparatus just described by way of example, including as it does all the variants thereof.

Thus, the member for holding and moving the planet carrier in the case of the first embodiment can be connected to the yoke of an electro-magnet holding the apparatus in fixed position when it is supplied, and letting it fall when supply is cut off. In practice, it is not necessary for this holding and moving member to be connected to the rotor of the differential driving motor.

Similarly, in the case of the second embodiment, connecting the member for moving and holding the movable support to the rotor of the stepping motor can be envisaged.

Other apparatuses allowing movement of the planet carrier can also be envisaged, as long as these apparatuses allow movement of the planet carrier to be effected in a very reliable way in the event of emergency shutdown of the reactor.

In addition, an apparatus has been described in which setting the differential in rotation is obtained from a stepping motor with variable reluctance, but it is also possible to set the differential in rotation to move the control rod by means of other motor apparatuses, and especially by means of an asynchronous motor and a revolving magnetic crosspiece in combination, as long as these apparatuses allow movements with exactly controlled amplitude to be carried out and holding in position of the driven apparatus by fixing of the motor apparatus.

The carrier pulley or pulleys can be constituted by portions of chain wheels or by pulleys which are identical to the drive pulleys used at the upper part of the apparatus, the determining parameter being the amplitude of rotation of the cam necessary for opening and closing the fingers.

Any number of drive pulleys or carrier pulleys and any number of chains can be used, as long as there are at least two vertical lifting portions on either side of the carrier pulley shaft.

Roller chains whose slack portions are stored in very tall vertical guides can be used or, alternatively, chains with welded links, stored in less tall wells, since these chains naturally coil up compactly when in the wells.

In conclusion, the apparatus according to the invention is applicable not only to controlling pressurized water nuclear reactors but also to any other type of reactor using absorbent elements with vertical movement for controlling the reactor and dropping of absorbent elements into the core into maximum insertion position for emergency shutdown.

What is claimed is:

1. In a nuclear reactor having a pressure vessel, a core in said vessel comprising a plurality of fuel assemblies each having vertically arranged fuel rods, and a plurality of control units having a cluster of neutron absorbing rods and an upper connecting part and each vertically movable between a lower position in which said cluster is in a position of maximum insertion in said core, and an upper position, a mechanism for individually moving one of said units, located within a casing sealingly connected to an upper portion of said vessel, said mechanism comprising (a) a grab vertically movable along and within said casing, having a body and downwardly directed fingers pivotably connected to said body for movement between a closed condition for connection with said connecting part and an open condition for releasing said connecting part;
   (b) carrier pulley means fixed on a horizontal shaft mounted for rotation on said body of said grab, operatively associated with said fingers such that rotation of said carrier pulley in one direction moves said fingers into closed position and rotation in the opposite direction moves said fingers into open position;
   (c) chain means having two lifting portions supporting said carrier pulley means and having a driving connection therewith, so arranged that synchronous up or down movement of said two lifting portions causes vertical movement of said grab while differential movement of said lifting portions causes rotation of said carrier pulley means;
   (d) each of said lifting portions passing over and being supported at the upper part of its course by a drive pulley carried by said casing; and
   (e) a differential pinion apparatus for driving said drive pulleys, having
      (i) a pair of pinions mounted for rotation about an axis fast with said casing and each drivably connected to one of said pulleys;
      (ii) a support mounted for pivotal movement with respect to said casing between two extreme predetermined positions;
      (iii) at least one driving pinion rotatably connected to said support and interconnecting both said pinions mounted for rotation about a fixed axis;
      (iv) motor means for driving said pinions mounted for rotation about a fixed axis in synchronism; and
      (v) movement means operationally connected to said movable support for maintaining the latter in a first of said extreme positions when energized and in the other of said extreme positions when de-energized;
      (vi) whereby de-energization of said movement means, whatever the vertical position of said grab, causes movement of said movable support from said first to said second extreme position and a differential rotative movement of said pinions mounted for rotation about a fixed axis and opening of said fingers for release and free fall of said cluster into said core.

2. The combination according to claim 1, wherein
   (a) said carrier pulley means comprises two identical carrier pulleys fixed on said horizontal shaft;
   (b) said chain means comprises two chains, one fixed by one of its ends to one of said carrier pulleys and passing over one of said drive pulleys, and the other fixed to the other carrier pulley in opposition to the first chain, with respect to said horizontal shaft and passing over the other of said drive pulleys; and
   (c) said differential pinion apparatus with bevel pinions having two differential pinions and at least one planet gear fixed in a planet carrier constituting the movable support of said differential, causing the rotation of said differential pinions in synchronism and in opposite directions when said planet carrier is held in position, one of said differential pinions being solid with said drive gear and one of said drive pulleys and the other differential pinion being solid with the other drive pulley.

3. A control rod mechanism according to claim 1, wherein one of said drive pulleys (85) is solid in rotation with the drive gear (94) of said differential, and the other drive pulley (89) is solid in rotation with a pinion (106) borne by said movable support (104) the movement of which causes a differential rotation of said pinions (105, 106) of said movable support (104) with respect to said pinions (95, 98) borne by said fixed support (90).

4. A control rod mechanism according to any one of claims 3, 1 and 2, comprising a cam for actuating said pivoting fingers (14) fixed on said horizontal shaft (15).

5. A control rod mechanism according to any one of claims 3, 1 and 2, wherein the apparatus for actuating said pivoting fingers (73, 74) is constituted by an assembly of links (77, 78) articulated, on the one hand, to said horizontal shaft (15), and on the other hand to said pivoting fingers (14).

6. A control rod mechanism according to any one of claims 3, 1 and 2, wherein said motor means (51, 52) for driving said digital drive gear (40) of said differential is a stepping motor the stator (51) of which is disposed outside said sealed casing (1) and the rotor (52) of which is disposed inside said casing and is vertically movable in one direction under the action of its weight and in the other under the action of magnetic forces exerted by said stator when the latter is supplied, the member for holding said movable support (47) and moving it in rotation comprising a shaft (50a) connected at one of its ends to said rotor (52) and at the other end to said movable support (47) through an articulated connecting rod (50b), the vertical displacement movements of said rotor (52) causing rotary movements of said movable support (47) for opening or closing said fingers of said grab and holding said rotor up by magnetic force, holding said movable support in fixed position and said fingers of said grab in closed position.

7. A control rod mechanism according to any one of claims 3, 1 and 2, wherein said motor means for driving said drive gear (94) of said differential is a stepping motor the stator (92) of which is disposed outside said sealed casing (70) and the rotor of which is disposed inside said casing, the member (109) for holding and moving said movable support (104) being constituted by a magnetic part (110) connected to a shaft (108) at one of its ends, the other end of said shaft being connected to said movable support (104) and an electro-magnet including a magnetic part (112) inside said sealed casing opposite the magnetic part (110) connected to the shaft (108) and a coil (113) surrounding said sealed casing and subjecting said magnetic part to a magnetic field so as to hold said movable support in position for closing said fingers.

* * * * *